Dec. 15, 1931.  A. C. CHRISTENSEN  1,836,225
SPEED REDUCING PULLEY
Filed May 19, 1930   2 Sheets-Sheet 1
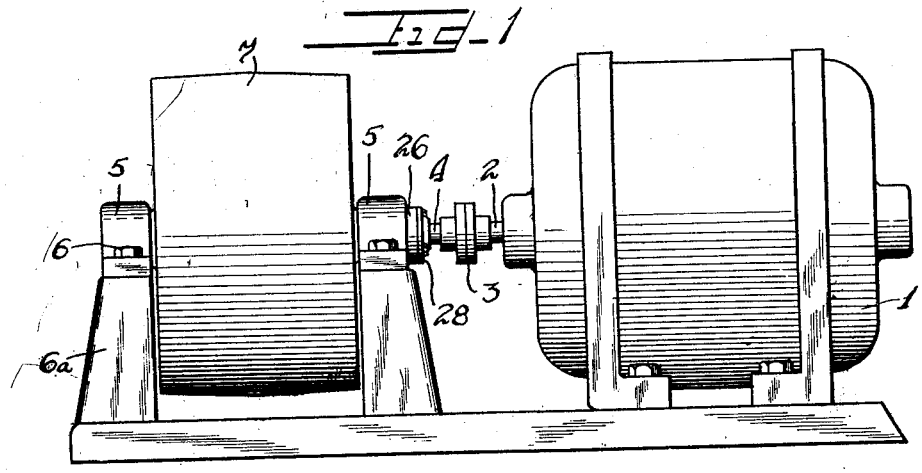
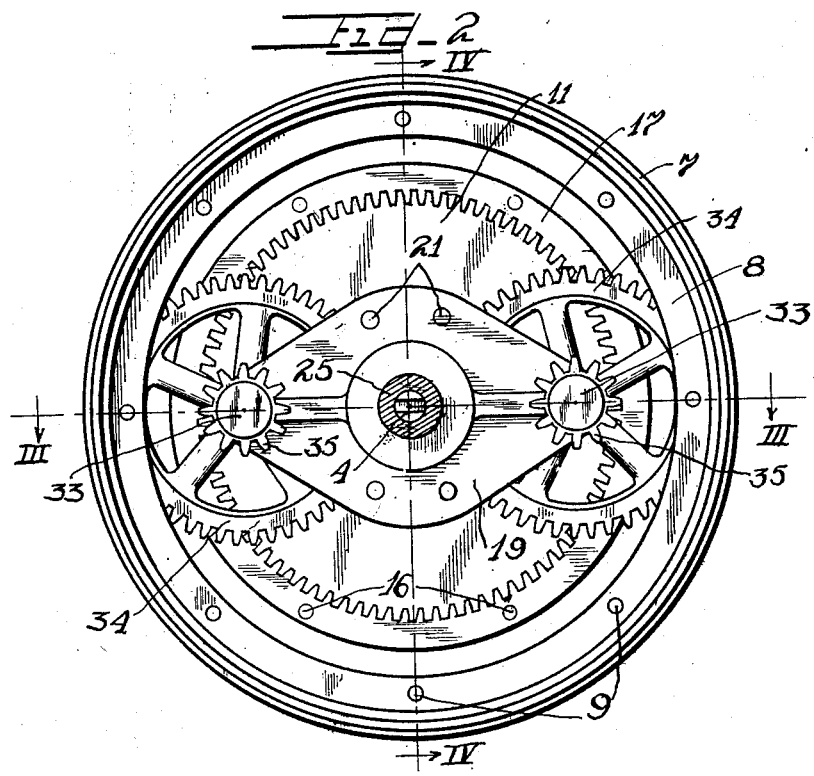
Inventor
Alfred C. Christensen
by  Charles Filla
Attys.

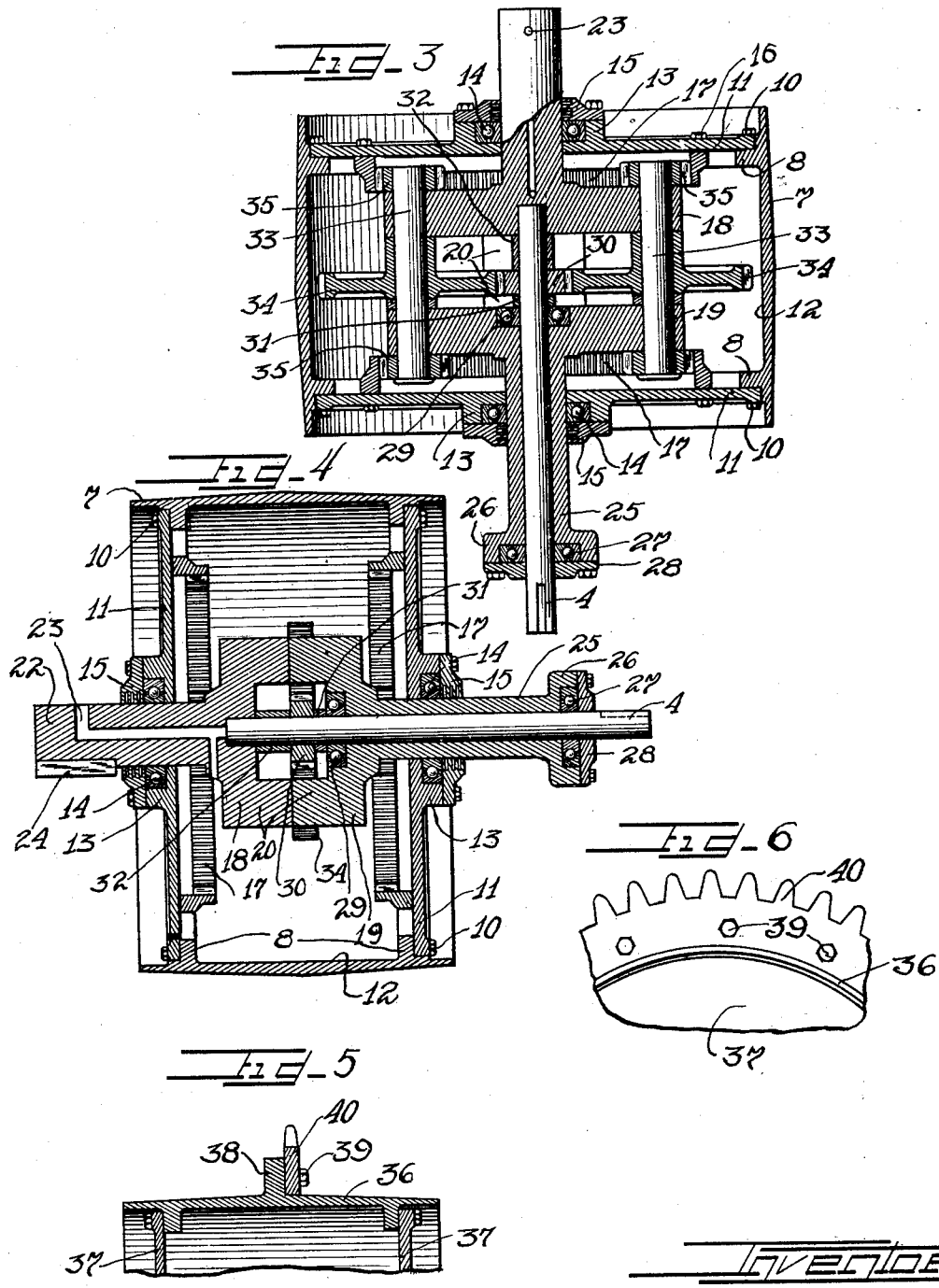

Patented Dec. 15, 1931

1,836,225

UNITED STATES PATENT OFFICE

ALFRED C. CHRISTENSEN, OF CHICAGO, ILLINOIS

SPEED REDUCING PULLEY

Application filed May 19, 1930. Serial No. 453,469.

This invention relates to an improved type of speed-reducing mechanism and covers a combination pulley housing having speed-reducing intermeshing gears mounted therein and so arranged that a high speed received from a driving shaft is reduced and transmitted to the pulley which forms the housing for the speed-reducing gear mechanism.

It is an object of this invention to provide an improved type of combination pulley and speed-reducing mechanism adapted to transmit a drive from a high-speed shaft to the pulley at a reduced rate through groups of speed-reducing members.

It is also an object of this invention to provide an improved type of speed-reducing mechanism wherein a pulley is connected with a high-speed driving shaft through groups of intermeshing low-speed pinions and gears connected to receive a drive from a high-speed pinion connected with the high-speed driving shaft.

It is a further object of this invention to provide an improved type of speed-reducing device wherein a high-speed driving shaft is journalled in a bearing on which a low-speed pulley is journalled, having internal gears mounted therein and coacting with sets of external gears secured on shafts journalled in the bearing unit in which the high-speed driving shaft is also journalled It is furthermore an object of this invention to provide an improved type of speed-reducing mechanism comprising a combination embodying a high-speed driving shaft and a low-speed pulley connected by groups of internal and external gear members arranged in intermeshing relation and receiving a drive from a high-speed pinion secured on the high-speed driving shaft.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of an improved speed-reducing pulley embodying the principles of this invention and shown coupled with a driving motor.

Figure 2 is an enlarged end view of the speed-reducing pulley with one of the end plates removed to disclose the interior gear mechanism.

Figure 3 is a reduced diametric sectional view taken on line III—III of Figure 2, with parts shown in elevation.

Figure 4 is a reduced diametric sectional view of the device taken on line IV—IV of Figure 2, with parts shown in elevation.

Figure 5 is a fragmentary sectional view of a modified form of pulley housing equipped with an external peripheral sprocket ring.

Figure 6 is a fragmentary side elevation of the modified form of pulley housing and sprocket ring illustrated in Figure 5.

As shown on the drawings:

The reference numeral 1 indicates a driving motor having a driving shaft 2 which is connected by means of a coupling 3 to a high-speed driving shaft 4 forming part of the improved speed-reducing pulley mechanism embodying the principles of this invention.

The improved pulley device is adapted to be supported by means of bearing blocks 5 having flanged members provided with openings for the reception of mounting bolts 6 to permit the bearing blocks to be rigidly secured upon any suitable type of support 6a.

The speed-reducing device comprises a drum or pulley housing 7 having integrally formed on the inner peripheral surface thereof a pair of spaced flange rings 8, each of which is provided with a plurality of internally threaded apertures 9 for the reception of retaining screws 10 which project through apertures provided in the peripheral margin of an end closure plate 11, one of which plates is provided in each end of the pulley housing 7 to provide an interior gear chamber 12 within the pulley housing. Each of the end closure plates 11 has integrally formed on the outer side of the middle portion thereof a hub 13 provided with a chamber or recess for the reception of a ball-bearing unit 14 which is retained in place by means of a cap ring 15. Rigidly secured by means of rivets 16, or other suitable means, to the inner side of each of the end plates 11 is a low-speed internal gear 17.

Disposed axially within the pulley housing 7 is a bearing block or housing comprising two oppositely positioned bearing walls or plates 18 and 19, each of which is provided with a pair of projections or blocks 20 with the blocks 20 of one bearing plate contacting the blocks 20 of the opposite bearing plate, as clearly illustrated in Figure 4. The bearing plates 18 and 19 are rigidly secured together to form a bearing unit by means of rivets 21, or other suitable means, which project through the bearing plates 18 and 19 and the bearing blocks 20 forming a part thereof.

Integrally formed on the outer face of the bearing plate or wall 18 is a stationary stub shaft 22 which projects outwardly through one of the end plates 11 and the ball-bearing unit 14 and the cap ring 15 forming a part thereof. The stub shaft 22 is provided with lubricating passages 23 and projects into one of the supporting blocks 5, and is secured thereto against rotation by means of a key 24 or other suitable means.

Integrally formed on the bearing plate or wall 19 is an outwardly projecting stationary bearing shaft or sleeve 25 which projects outwardly through the ball-bearing unit 14 and the cap ring 15 of the second closure plate 11. Integrally formed on the outer end of the bearing shaft or sleeve 25 is a chambered head 26 having a ball-bearing unit 27 engaged therein and retained in place by means of a closure ring or cap 28.

The high-speed shaft 4 projects through the bearing shaft or sleeve 25, as clearly illustrated in Figure 4, and has the inner end thereof journalled in a suitable bearing recess provided in the inner end of the stationary stub shaft 22. The inner portion of the high-speed shaft 4 is provided with a ball-bearing unit 29 which is mounted in a recess provided in the bearing wall or plate 19.

Keyed or otherwise secured on the high-speed shaft 4 between the bearing plates or walls 18 and 19 is a high-speed pinion 30 which is spaced from the ball-bearing unit 29 by means of a spacer ring or collar 31 and from the inner surface of the bearing wall or plate 18 by means of a spacer sleeve 32.

Journalled through each end of the bearing housing, formed by the plates 18 and 19 and the blocks 20 thereof, is an auxiliary or stub shaft 33 having keyed thereon between the bearing walls 18 and 19 a low-speed gear 34 which is in mesh with the high-speed pinion 30 on the shaft 4. Keyed or otherwise secured on the outer end of each of the stub shafts 33 are low-speed pinions 35 which have meshing engagement with the low-speed internal gears 17 mounted within the pulley housing 7. It will thus be noted that the high-speed driving pinion 30 has meshing driving engagement with the two low-speed gears 34, whereby a reduced drive is adapted to be transmitted to the two sets of low-speed pinions 35 and the respective internal gears 17 with which they are in mesh. The pulley housing 7 is thus adapted to be rotated at a reduced rate of speed from that transmitted by the high-speed pinion 30 on the high-speed shaft 4, with the rate of rotation of the pulley housing 7 depending upon the sizes of the intermeshing low-speed gears and pinions and the high-speed pinion forming the speed-reducing gear mechanism.

Figures 5 and 6 illustrate a modified form of pulley housing adapted to be equipped with a speed-reducing gear mechanism similar to the type illustrated and described in connection with Figures 1 to 4, inclusive. In this form of the device, the pulley housing is represented by the reference numeral 36 and is provided with end closure plates 37. Integrally formed on the outer periphery of the pulley housing 36 is a flange ring or web 38 provided with a plurality of threaded openings for the reception of retaining screws or bolts 39 which engage through apertures provided in a sprocket ring 40 to hold the sprocket ring rigidly secured to the ring flange 38 forming part of the pulley housing 36. This arrangement permits a chain to be engaged around the sprocket ring 40 to permit a reduced drive to be transmitted from the high-speed driving shaft to the pulley housing 36 and to the sprocket ring 40 mounted thereon. If desired, a plurality of sprocket rings may be engaged on the exterior of the pulley housing to permit a plurality of chains to be driven at a reduced rate of speed.

It will, of course, be understood that various details of construction may be varied through a wide range without departing from the principles of this invention, and it is, therefore, not purposed to limit the patent granted hereon otherwise than necessitated by the scope of the appended claim.

I claim as my invention:

A speed-reducing device comprising a pulley, a pair of spaced stationary plates within said pulley, a stationary shaft integrally formed on one of said plates, a pulley end plate journalled on said stationary shaft and rigidly secured to said pulley, a stationary bearing sleeve integrally formed on the other of said stationary plates, a second pulley end plate journalled on said stationary bearing sleeve and rigidly secured to said pulley, internal gears rigidly secured on the inner faces of the pulley end plates, a pair of auxiliary shafts journalled in said stationary plates within the pulley, a plurality of low-speed pinions keyed on said auxiliary shafts and having meshing engagement with said internal gears, a plurality of low-speed gears keyed on said auxiliary shafts between said stationary plates, a high-speed driving shaft journalled in said stationary bearing sleeve and in said stationary bearing plates, and a high-speed pinion keyed on said high-speed shaft between said bearing plates and having meshing engagement with said low-speed gears.

In testimony whereof I have hereunto subscribed my name at Chicago, Cook County, Illinois.

ALFRED C. CHRISTENSEN.